(12) United States Patent
Kim et al.

(10) Patent No.: US 9,755,270 B2
(45) Date of Patent: Sep. 5, 2017

(54) SODIUM SECONDARY BATTERY INCLUDING GRAPHITE FELT HAVING PORE CHANNELS FORMED THEREIN

(71) Applicant: SK Innovation Co., Ltd., Seoul (KR)

(72) Inventors: Young Shol Kim, Daejeon (KR); Ku Bong Chung, Daejeon (KR); Jeong Soo Kim, Daejeon (KR); Seung Hwan Jo, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 78 days.

(21) Appl. No.: 14/526,977

(22) Filed: Oct. 29, 2014

(65) Prior Publication Data

US 2015/0303452 A1    Oct. 22, 2015

(30) Foreign Application Priority Data

Oct. 30, 2013    (KR) .................. 10-2013-0130342

(51) Int. Cl.
| | |
|---|---|
| *H01M 4/36* | (2006.01) |
| *H01M 10/054* | (2010.01) |
| *H01M 2/02* | (2006.01) |
| *H01M 4/58* | (2010.01) |
| *H01M 4/66* | (2006.01) |
| *H01M 4/80* | (2006.01) |
| *H01M 10/39* | (2006.01) |

(52) U.S. Cl.
CPC ......... *H01M 10/054* (2013.01); *H01M 4/582* (2013.01); *H01M 4/663* (2013.01); *H01M 4/806* (2013.01); *H01M 10/39* (2013.01)

(58) Field of Classification Search
None
See application file for complete search history.

(56) References Cited

U.S. PATENT DOCUMENTS

| | | | |
|---|---|---|---|
| 3,918,991 A | 11/1975 | Hess | |
| 4,066,826 A | 1/1978 | Jones et al. | |
| 5,510,210 A * | 4/1996 | Kim | H01M 10/3918 429/320 |
| 2003/0054255 A1 | 3/2003 | Hidaka et al. | |
| 2010/0279165 A1* | 11/2010 | Lemmon | H01M 4/38 429/102 |
| 2011/0104526 A1 | 5/2011 | Boxley et al. | |
| 2015/0194641 A1* | 7/2015 | Tsuji | H01M 2/022 429/156 |

* cited by examiner

*Primary Examiner* — Muhammad Siddiquee
(74) *Attorney, Agent, or Firm* — The Webb Law Firm

(57) ABSTRACT

Provided is a sodium secondary battery including: a sodium ion conductive solid electrolyte separating an anode space and a cathode space from each other; an anode positioned in the anode space and containing sodium; a cathode solution positioned in the cathode space; and a cathode immersed in the cathode solution and including graphite felt formed with open pore channel of which an opening part is formed on a surface of the graphite felt facing the solid electrolyte.

12 Claims, 10 Drawing Sheets

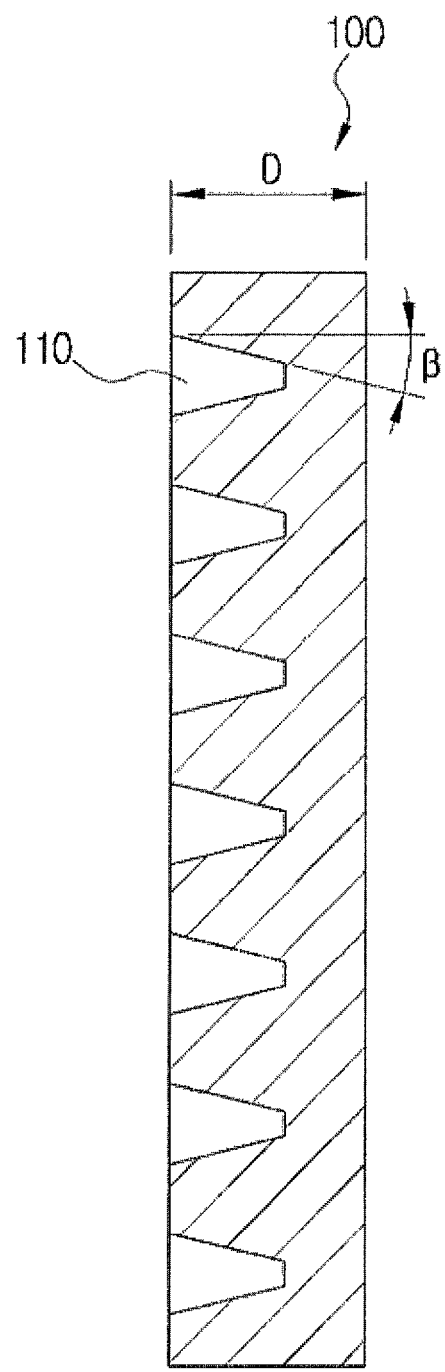

SODIUM SECONDARY BATTERY INCLUDING GRAPHITE FELT HAVING PORE CHANNELS FORMED THEREIN

CROSS-REFERENCE TO RELATED APPLICATIONS

This application claims priority to Korean Patent Application No. 10-2013-0130342, filed Oct. 30, 2013, the disclosure of which is hereby incorporated in its entirety by reference.

TECHNICAL FIELD

The following disclosure relates to a sodium secondary battery, and more particularly, to a sodium secondary battery including graphite felt having pore channels formed therein.

BACKGROUND

In accordance with a rapid increase in the use of renewable energy, the necessity for an energy storage device using a battery has rapidly increased. Among these batteries, a lead battery, a nickel/hydrogen battery, a vanadium battery, and a lithium battery may be used. However, since the lead battery and the nickel/hydrogen battery have significantly low energy density, they require a large space in order to store the same capacity of energy therein. Further, in the case of the vanadium battery, the vanadium battery uses a solution containing a heavy metal, which causes environmental contamination, and a small amount of materials may move between an anode and a cathode through a membrane separating the anode and the cathode from each other, which deteriorates performance. Therefore, the vanadium battery cannot be commercialized on a large scale. The lithium battery having significantly excellent energy density and output characteristics is significantly advantageous in view of a technology. However, the lithium battery is disadvantageous in view of economic efficiency for being used as a secondary battery for large scale power storage due to scarcity of a lithium material.

In order to solve this problem, many attempts to use a sodium resource, which is sufficiently present on Earth, as a material of the secondary battery have been conducted. Among them, as disclosed in U.S. Patent Laid-Open Publication No. 20030054255, a sodium-sulfur battery having a form in which a beta alumina having selective conductivity for a sodium ion is used, an anode is loaded with sodium, and a cathode is loaded with sulfur has been currently used as a large scale power storage.

However, in the existing sodium based secondary battery such as the sodium-sulfur battery or a sodium-nickel chloride battery, conductivity thereof and melting points of battery compositions should be considered. For example, the sodium-nickel chloride battery has an operation temperature of at least 250° C. or more, and the sodium-sulfur battery has an operation temperature of at least 300° C. or more. Due to this problem, there are many disadvantages in view of economical efficiency in manufacturing or operating the sodium based secondary battery while maintaining a temperature and sealability of the battery and reinforcing the safety thereof. In order to solve the above-mentioned problems, a room-temperature sodium based battery has been developed, but the output thereof is significantly low, such that the room-temperature sodium based battery has significantly low competitiveness as compared with the nickel-hydrogen battery or the lithium battery.

RELATED ART DOCUMENT

Patent Document

U.S. Patent Laid-Open Publication No. 20030054255

SUMMARY

An embodiment of the present invention is directed to providing a sodium secondary battery capable of preventing capacity from being decreased at the time of repeating charge and discharge cycles, operating at a low temperature, improving an output and a charge and discharge rate of the battery, stably maintaining charge and discharge cycle characteristics for a long period time, preventing degradation to improve a battery lifespan, and improving stability of the battery.

In one general aspect, a sodium secondary battery includes: a sodium ion conductive solid electrolyte separating an anode space and a cathode space from each other; an anode positioned in the anode space and containing sodium; a cathode solution positioned in the cathode space; and a cathode immersed in the cathode solution and including graphite felt formed with open pore channels of which an opening part is formed on a surface of the graphite felt facing the solid electrolyte.

In one general aspect, a sodium secondary battery includes: a sodium ion conductive solid electrolyte separating an anode space and a cathode space; an anode positioned in the anode space and containing sodium; a catholyte (cathode solution) positioned in the cathode space; and a cathode including a graphite felt impregnated into the catholyte and provided with open pore channels having opening parts formed in a surface facing the solid electrolyte.

One end of the open pore channel may be positioned in the graphite felt.

The open pore channel may penetrate through the graphite felt.

The open pore channel may have a tapered shape in which a cross section thereof becomes narrow in a length direction.

The open pore channel may be regularly distributed.

A density of the pore channel corresponding to the number of opening part per unit surface area of the graphite felt may be $1/cm^2$ to $50/cm^2$.

A total area of pore opening parts corresponding to a total sum of areas of the opening parts of the pore channels may be 20 to 80% based on the entire surface area (100%) of the surface of the graphite felt facing the solid electrolyte.

The sodium secondary battery may further include a cylindrical metal case of which one end is closed and the other end is opened, wherein the cathode space and the anode space are partitioned by a tube type solid electrolyte of which one end inserted into the metal case is closed.

The sodium secondary battery may further include a cylindrical metal case of which one end is closed and the other end is opened, wherein the cathode space and the anode space are separated by a tubular solid electrolyte of which one end inserted into the metal case is closed.

The cathode space may be a space between the metal case and the solid electrolyte, and the graphite felt may have a cylindrical shape in which the graphite felt comes in contact with an inner surface of the metal case.

The cathode may further contain a transition metal attached or loaded in the graphite felt.

The cathode solution may contain: a metal halide corresponding to a halide of at least one metal selected from transition metals and Groups 12 to 14 metals; and a solvent dissolving the metal halide.

At the time of discharge, metal ions of the metal halide contained in the cathode solution may be converted into a metal to thereby be electroplated on the graphite felt, and at the time of charge, the metal electroplated on the graphite felt may be converted into the metal ions to thereby be dissolved in the cathode solution.

At the time of discharge, metal ions of the metal halide contained in the catholyte may be electrodeposited on the graphite felt as the metals, and at the time of charge, the metals electrodeposited on the graphite felt may be dissolved into the catholyte as the metal ions.

BRIEF DESCRIPTION OF THE DRAWINGS

FIG. 4A is a cross-sectional view showing an example of the graphite felt provided in the sodium secondary battery according to the exemplary embodiment of the present invention.

DETAILED DESCRIPTION OF EMBODIMENTS

Figure 1:
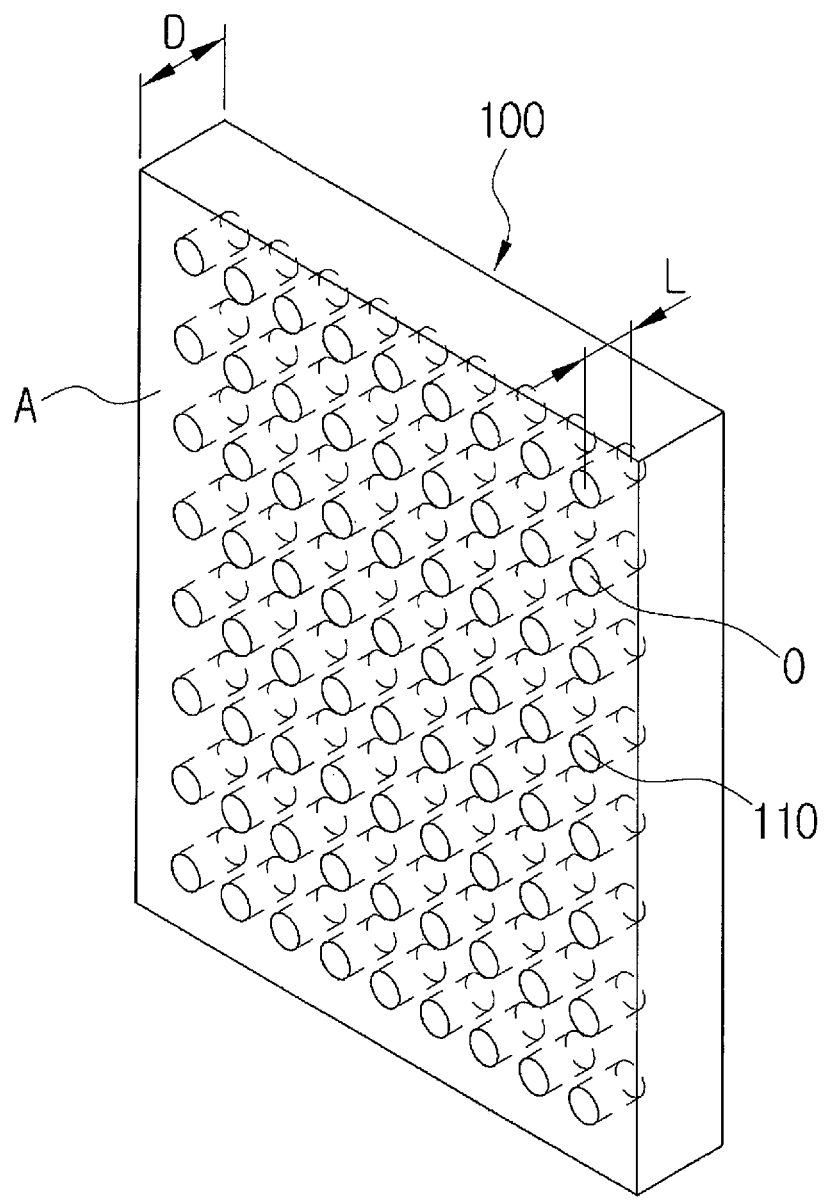
FIG. 1 is a perspective view showing an example of graphite felt provided in a sodium secondary battery according to an exemplary embodiment of the present invention.

Hereinafter, a sodium secondary battery according to the present invention will be described in detail with reference to the accompanying drawings. The following accompanying drawings are provided by way of example so that the idea of the present invention can be sufficiently transferred to those skilled in the art to which the present invention pertains. Therefore, the present invention is not limited to the drawings to be provided below, but may be modified in many different forms. In addition, the drawings to be provided below may be exaggerated in order to clarify the scope of the present invention. Like reference numerals denote like elements throughout the specification.

Here, technical terms and scientific terms used in the present specification have the general meaning understood by those skilled in, the art to which the present invention pertains unless otherwise defined, and a description for the known function and configuration unnecessarily obscuring the present invention will be omitted in the following description and the accompanying drawings.

A sodium secondary battery according to the present invention includes a sodium ion conductive solid electrolyte separating an anode space and a cathode space from each other, an anode positioned in the anode space and containing sodium, a cathode solution positioned in the cathode space, and a cathode immersed in the cathode solution, said cathode comprising a body of porous graphite felt which includes, in addition to pores of the body of porous graphite felt, open channels having openings formed on a surface of the body of porous graphite felt facing the solid electrolyte. In this case, each open channel does not include a pore of the body of porous graphite felt itself.

In the sodium secondary battery according to an exemplary embodiment of the present invention, a cathode current collector may include the graphite felt, and the sodium secondary battery may be a battery in which a metal is electroplated on the cathode current collector at the time of charging or discharging the battery. More particularly, the sodium secondary battery may be a battery in which metal ions contained in the cathode solution are converted into a metal to thereby be electroplated on the cathode current collector.

Since the graphite felt does not react with a battery component such as the cathode solution, the graphite felt is chemically stable and has high porosity, such that a wide reaction area may be provided, and at the same time, a large amount of the cathode solution may be loaded therein.

However, in the case of using graphite felt as a cathode current collector, when a metal is electroplated on the graphite felt at the time of a charge or discharge reaction of a battery, the electroplating is generated on the surface of the graphite felt, such that pores of the graphite felt may be closed by the electroplated metal. In addition, an electroplating rate may be changed depending on regions of the graphite felt where the electroplating is generated by a non-uniform electric field and potential caused by a porous structure. In the case in which pores of the surface of the graphite felt are first closed by the electroplating, a reaction area where a battery reaction may occur during a charge or discharge process may be significantly decreased, and in the case in which the non-uniform electroplating is aggravated, the electroplated metals may be detached in a particulate phase from the current collector, such that a permanent capacity loss may be generated. In addition, non-uniform dissolution may be generated by the non-uniform electroplating, such that metals that are not yet dissolved even in this dissolution process may be detached in the particulate phase from the current collector. Therefore, as the charge and discharge cycle is repeated, the permanent capacity loss of the battery may be further increased.

In the sodium secondary battery according to the present invention, non-uniform electroplating and dissolution of the metal and the closing of pores positioned on the surface of the graphite felt may be prevented by applying the graphite felt having excellent chemical stability, a wide reaction area, and a large loading amount of the cathode solution and formed with the open pore channels of which the opening part is formed on the surface of the graphite felt facing the solid electrolyte as the cathode current collector.

In detail, the open pore channels formed in the graphite felt may increase a contact area between the graphite felt and the cathode solution and serve to provide a large amount of nucleation site when the metal is electroplated. At the same time, even though the electroplated metal particles are detached from the graphite felt, the detached metal particles are positioned in the open pore channel in a state in which the detached metal particles physically come in contact with graphite, thereby making it possible to physically prevent the metal particles from being detached to the outside of the graphite felt.

In the sodium secondary battery according to the exemplary embodiment of the present invention, the open pore channel may be a non-through channel or through channel. In detail, the non-through channel may mean a channel of which one end opposite to the opening part of the open pore channel is positioned in the graphite felt, and the through channel may mean a channel in which the open pore channel penetrates through two surfaces of the graphite felt opposing each other.

In the sodium secondary battery according to the exemplary embodiment of the present invention, a cross-sectional area of the pore channel formed in the graphite felt may be constant or changed in a length direction thereof.

More specifically, the cross-sectional area of the open pore channel formed in the graphite felt is constant in the length direction thereof, which means that a shape and the cross-sectional area of the open pore channel are not changed in the length direction but are constantly maintained. In the case in which the cross-sectional area of the open pore channel is constant, the graphite felt may be easily and simply processed, which may be commercially advantageous.

In detail, the cross-sectional area of the open pore channel is changed in the length direction, which means that the shape of the open pore channel in the length direction of the pore channel is changed and accordingly, the cross-sectional thereof is changed, or the shape of the open pore channel is constant in the length direction of the pore channel but the cross-sectional area is changed.

In more detail, the cross-sectional area of the open pore channel is changed in the length direction, which means that a cross section of the pore channel becomes narrow in the length direction thereof, and a change in the cross-sectional area may be continuous or discontinuous. When the cross-sectional area of the open pore channel is changed in the length direction thereof, in the case in which a cross-sectional area of a region including the opening part coming in contact with the cathode solution is relatively large, there are advantages in that a flow of the cathode solution and movement of materials (sodium ion flux) may be more smoothly performed.

In the sodium secondary battery according to the exemplary embodiment of the present invention, the cross section of the open pore channel formed in the graphite felt may have a circular shape, an oval shape, or a polygonal shape ranging from triangular to octagonal shapes, and the opening part of the pore channel may also have a circular shape, an oval shape, or a polygonal shape ranging from triangular to octagonal shapes.

In the sodium secondary battery according to the exemplary embodiment of the present invention, a total area of pore opening parts, which is a total sum of areas of the opening parts of the pore channels, may be 20 to 80% based on the entire surface area (100%) of the surface of the graphite felt facing the solid electrolyte. In the case in which the total area of the pore opening parts is less than 20%, there is a risk that flow of the cathode solution and movement of the materials through the opening parts will not be smoothly performed, and in the case in which the total area of the pore opening parts is more than 80%, a density of the pore channel, which is the number of pore channel opening parts per the surface area of the graphite felt, may be decreased, such that an effect of increasing the contact area with the cathode solution may become insufficient, and there are risks that an effect of providing the nucleation site at the time of electroplating the metal ions will be insufficient and the metal particles detached in the pore channel will be released outside the pore channel to thereby be permanently detached therefrom.

In the sodium secondary battery according to the exemplary embodiment of the present invention, the open pore channels formed in the graphite felt may be regularly or irregularly distributed. In detail, distribution of the open pore channel may correspond to the distribution of the opening part on the surface of the graphite felt, and the opening part of the pore channel may be regularly or irregularly distributed on the surface of the graphite felt.

In the case in which the opening part of the pore channel is regularly distributed, the structure of the pore channel is physically stable like a honeycomb structure, and the density of the pore channel may be significantly increased. In detail, the opening part of the pore channel may be arranged in a form of a polygon selected from a rectangle, a square, a regular hexagon, or a parallelogram as a repetitive basic form, and each of the opening parts may be positioned at each of the vertexes of the polygons or each of the vertexes and central points thereof.

Discontinuous distribution of the opening part of the pore channel means that distribution of the opening part of the pore channel may be changed according to regions of the surface, on the surface of the graphite felt in which the opening part is positioned. In detail, distribution of the opening part at an edge region of the graphite felt may be different from distribution of the opening part at a central region of the graphite felt, and the density of the opening part at the central region may be relatively higher than that of the opening part at the edge region thereof. In this case, at the edge region and the central region, the opening parts of the pore channel may be independently arranged in a form of a polygon selected from a rectangle, a square, a regular hexagon, or a parallelogram as a repetitive basic form, and each of the opening parts may be positioned at each of the vertexes of the polygons or each of the vertexes and central points thereof. Distribution of the opening part as described above may be suitably designed in consideration of a structure of the sodium secondary battery to be designed and a change in sodium ion flux according to the position of the graphite felt at the time of charging and discharging the battery.

In the sodium secondary battery according to the exemplary embodiment of the present invention, the density of the pore channel, which is the number of opening parts per unit surface area of the graphite felt, may be 1 to 50/cm$^2$. When the density of the pore channel is less than 1/cm$^2$, the effect of increasing the contact area with the cathode solution may be insignificant, and an effect of providing the nucleation site at the time of electroplating the metal ion may become insignificant. When the density of the pore channel is more than 50/cm², it is not easy to process the pore channel due to an excessively high density of the channel, and physical stability of the graphite felt may be damaged. Here, in the case in which the pore channels are irregularly distributed in the graphite felt, the density of the pore channel may be changed according to the region of the graphite felt within a channel density of 1 to 50/cm².

A thickness of the graphite felt may be suitably designed in consideration of capacity of a battery to be designed. In the case of the non-through open pore channel, a length of the open pore channel in a direction parallel with a thickness direction of the graphite felt may be ⅓ to 9/10 of the thickness of the graphite felt.

Figure 2:
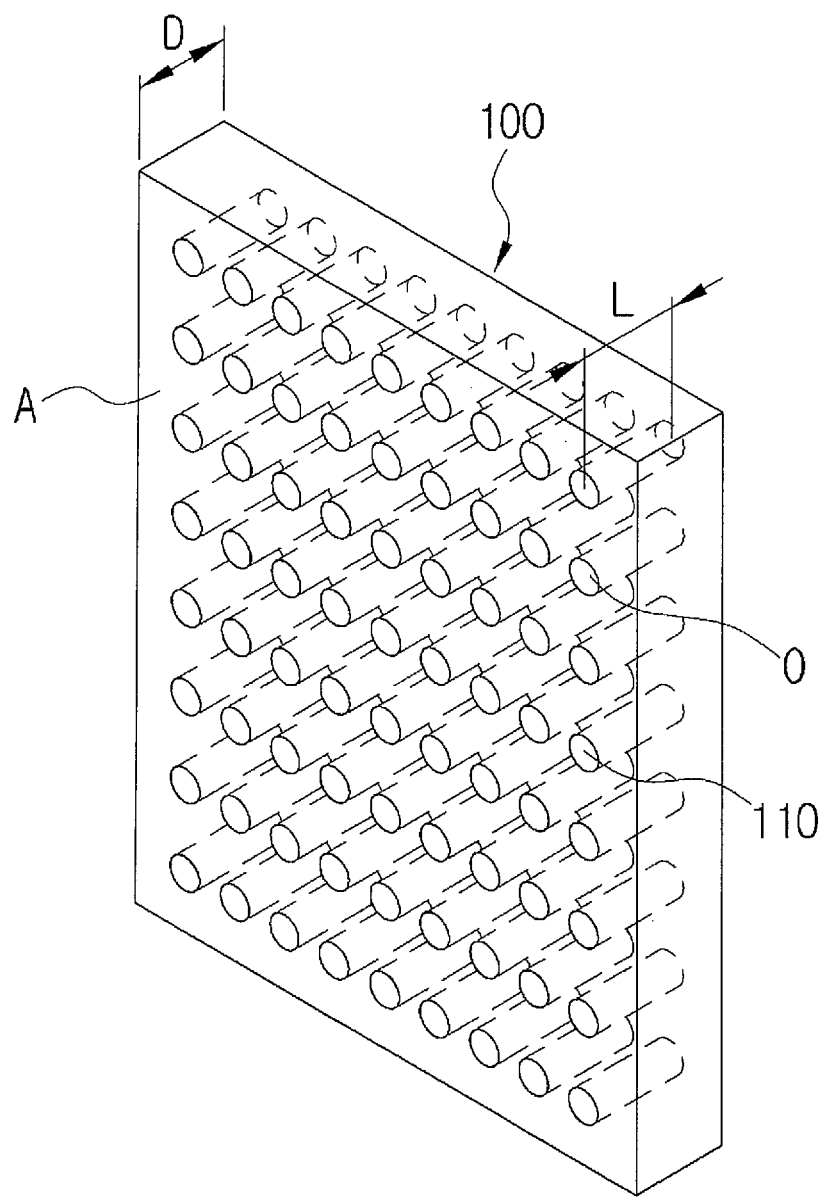
FIG. 2 is a perspective view showing another example of the graphite felt provided in the sodium secondary battery according to the exemplary embodiment of the present invention.

FIGS. 1 and 2, which are perspective views showing examples of graphite felt provided in the sodium secondary battery according to the exemplary embodiment of the present invention, show the case in which open pore channels having a circular cross section are uniformly formed in the graphite felt, and a length direction of the pore channel is parallel with a thickness direction of the graphite felt by way of example.

As in examples shown in FIGS. 1 and 2, the graphite felt 100 may be formed with open pore channels 110 of which an open part O is positioned on a surface A (hereinafter, referred to as a "first surface") coming in contact with the cathode solution, wherein the open pore channels 110 may be uniformly formed in the first surface.

As shown in FIG. 1, the open pore channel 110 may be a non-through channel of which one end corresponding to the opening part O is positioned in the graphite felt 100. Alternatively, as shown in FIG. 2, the open pore channel 110 may be a through channel penetrating through the graphite felt 100.

As in the examples shown in FIGS. 1 and 2, a length direction L of the open pore channel 110 may be equal to a thickness direction D of the graphite felt 100. The thickness direction of the graphite felt may refer to a vertical direction between two widest surfaces of the graphite felt opposing each other and refer to a direction vertical to a contact surface between the cathode solution and graphite felt.

Figure 3A:
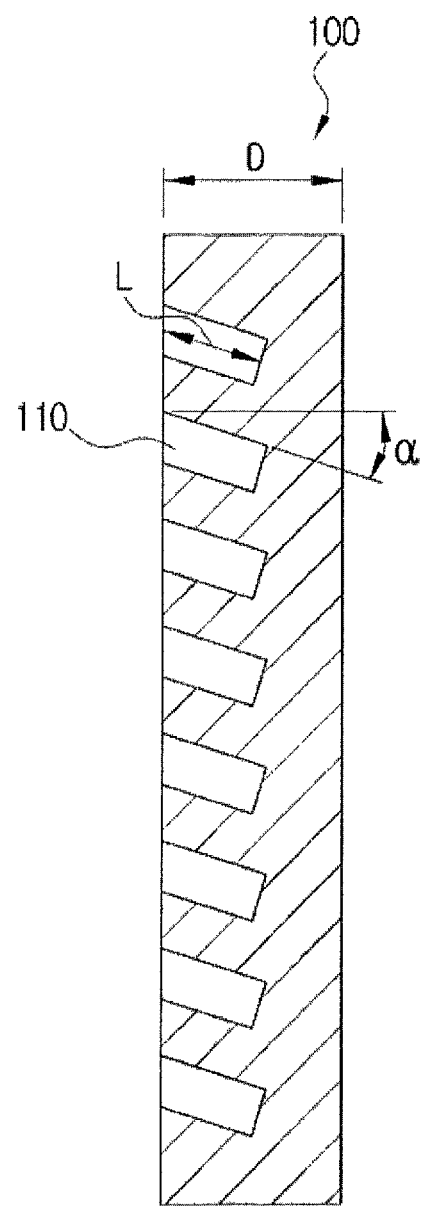
FIG. 3A is a cross-sectional view showing an example of the graphite felt provided in the sodium secondary battery according to the exemplary embodiment of the present invention.
Figure 3B:
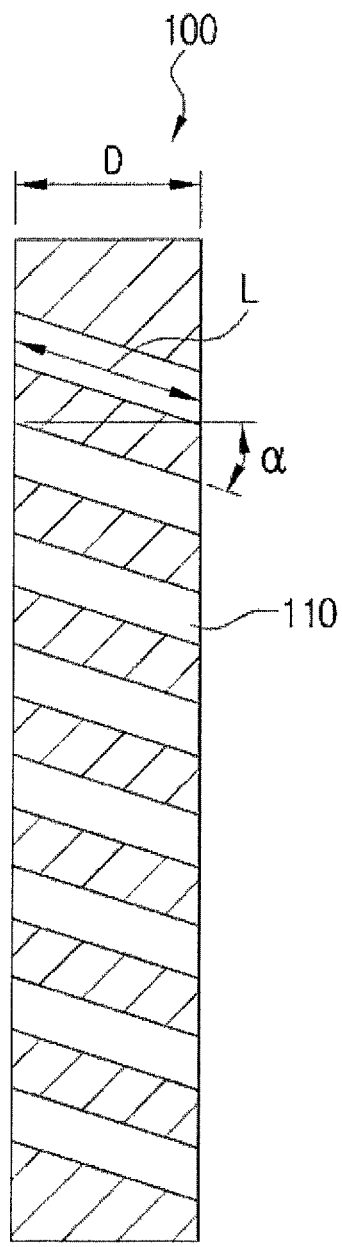
FIG. 3B is a cross-sectional view showing another example of the graphite felt provided in the sodium secondary battery according to the exemplary embodiment of the present invention.

FIGS. 3A and 3B, which are cross-sectional views showing examples of graphite felt provided in the sodium secondary battery according to the exemplary embodiment of the present invention, show the case in which open pore channels having a circular cross section are uniformly formed in the graphite felt, and a length direction of the pore channel is inclined at a predetermined angle with respect to a thickness direction of the graphite felt by way of example.

As shown in FIGS. 3A and 3B, the length direction L of the open pore channel 110 may have a predetermined angle (a) with respect to the thickness direction D of the graphite felt, and one end of an open part of the open pore channel may be positioned upwardly of the other end thereof.

Since the open pore channel is formed to be inclined at the predetermined angle with respect to the thickness direction of the graphite felt and formed to be further inclined in a gravity direction toward an inner portion of the graphite felt, even though metal particles are detached in the open pore channels, the detached metal particles may move in a direction toward the other end rather than a direction toward the opening part of the pore channel to thereby be seated. Therefore, even though the metal particles are detached in the open pore channels, the metal particles may be stably positioned in the graphite felt, and it is possible to effectively prevent the metal particles from being released outside the graphite felt, such that permanent capacity decrease of the battery may be more effectively prevented.

The angle (α) between the thickness direction of the graphite felt and the length direction of the open pore channel, that is, an inclined angle (α) of the open pore channel may satisfy the following Equation: $0°<α≤50°$. In the case in which the inclined angle (α) of the open pore channel is more than 50°, the detached metal particles may be stably seated in the graphite felt, but smooth flow of the cathode solution and smooth movement of the materials (including the sodium ion) in the length direction of the open pore channel may be inhibited.

Although non-through open pore channels are shown in the example of FIG. 3A, the open pore channel may be inclined at a predetermined angle with respect to the thickness direction of the graphite felt and be a through pore channel as shown in FIG. 3B.

Figure 4B:
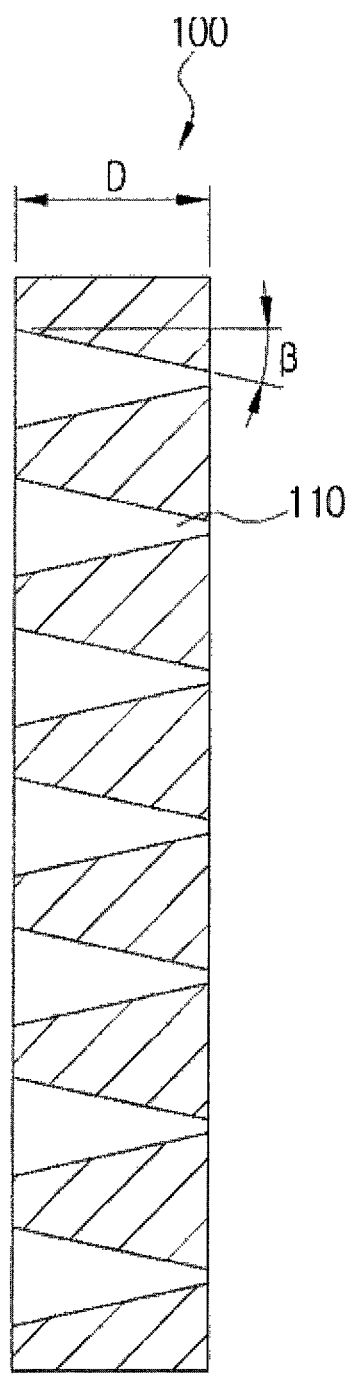
FIG. 4B is a cross-sectional view showing another example of the graphite felt provided in the sodium secondary battery according to the exemplary embodiment of the present invention.

FIGS. 4A and 4B, which are perspective views showing examples of graphite felt provided in the sodium secondary battery according to the exemplary embodiment of the present invention, show the case in which open pore channels having a circular cross section are uniformly formed in the graphite felt, and have a tapered shape in which a cross-sectional area of the pore channel is decreased in a length direction by way of example.

As shown in FIGS. 4A and 4B, in the open pore channel 110 having the tapered shape in which the cross-sectional area is gradually decreased from a surface in which an opening part is positioned toward an opposite surface, even though a length of the open pore channel is long, a flow of the cathode solution and movement of materials in the channel may be improved. In this case, a tapered angle (β) of the open pore channel may be 1° to 45°.

Although the case in which non-through open pore channels having the tapered shape and a length direction of the open pore channel is parallel with a thickness direction of the graphite felt is shown in the example of FIG. 4A, the open pore channel may be inclined at a predetermined angle with respect to the thickness direction of the graphite felt and have a tapered shape. In addition, the open pore channel may be a through pore channel rather than the non-through open pore channel as shown in FIG. 4B.

Although in the examples shown in FIGS. 1 to 4B, the graphite felt has a plate shape overall, the entire shape of the graphite felt may be changed according to an entire structure and shape of a secondary battery to be designed.

Figure 5A:
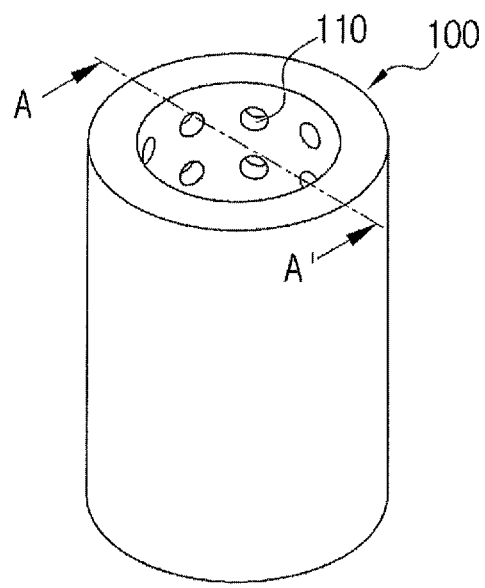
FIG. 5A is a perspective view showing another example of the graphite felt provided in the sodium secondary battery according to the exemplary embodiment of the present invention.
Figure 5B:
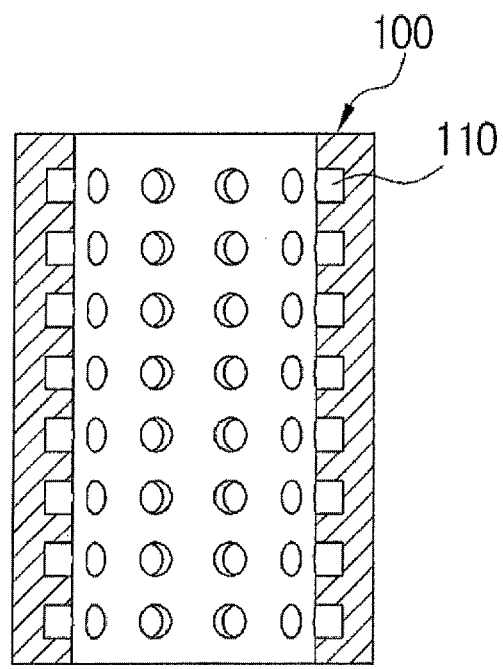
FIG. 5B is a cross-sectional view taken along line A-A of FIG. 5A.

FIG. 5A is a perspective view showing another example of the graphite felt provided in the sodium secondary battery according to the exemplary embodiment of the present invention and FIG. 5B is a cross-sectional view taken along line A-A' of FIG. 5A. As shown in FIGS. 5A and 5B, the graphite felt 100 may have a hollow cylindrical shape, and a first surface corresponding to a surface in which an opening part of the open pore channel 110 is positioned may be an inner surface of a hollow cylinder.

Figure 6A:
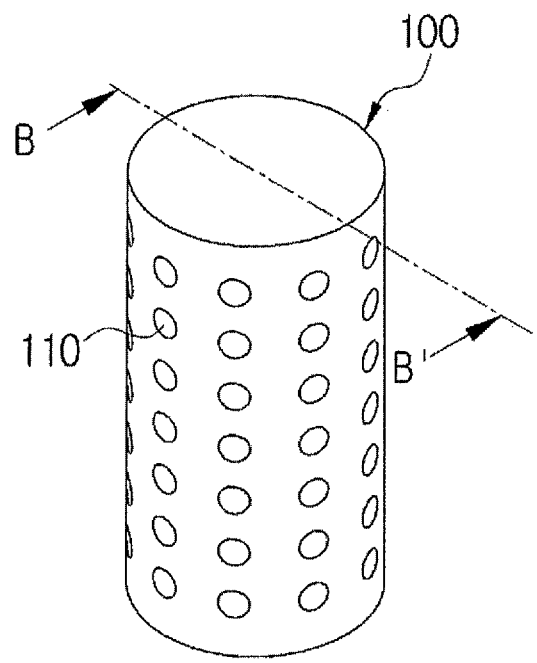
FIG. 6A is a perspective view showing another example the graphite felt provided in the sodium secondary battery according to the exemplary embodiment of the present invention.
Figure 6B:
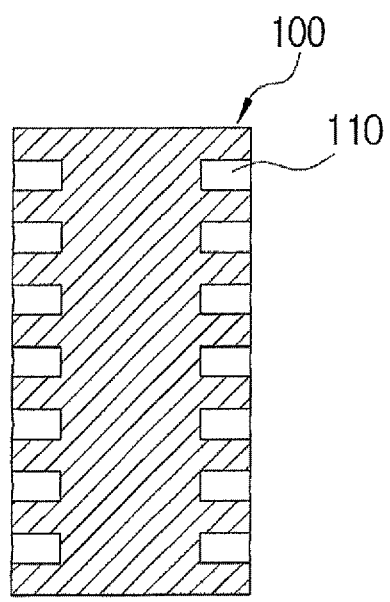
FIG. 6B is a cross-sectional view taken along line B-B' of FIG. 6A.

FIG. 6A is a perspective view showing another example of the graphite felt provided in the sodium secondary battery according to the exemplary embodiment of the present invention and FIG. 6B is a cross-sectional view taken along line B-B' of FIG. 6A. As shown in FIGS. 6A and 6B, the graphite felt 100 may have a cylindrical shape, and a first surface corresponding to a surface in which an opening part of the open pore channel 110 is positioned may be an outer surface of a cylinder.

The entire shape of the graphite felt described based on FIGS. 1 to 6B may be appropriately selected and changed according to a structure of a battery to be designed. More specifically, in the case in which the battery to be designed is a plate type battery, the graphite felt having a plate shape overall based on FIGS. 1 to 4B as described above may be used as the cathode current collector, but in the case in which the battery to be designed is a non-plate type battery (for example, a tube type battery), the graphite felt described based on FIGS. 5A to 6B may be used as the cathode current collector. More specifically, in the case in which the battery to be designed is a tube type battery and a cathode current collector is positioned at the center of a tube structure, the graphite felt described based on FIGS. 6A and 6B may be used as the cathode current collector, and in the case in which the battery to be designed is a tube type battery and a current collector is positioned adjacently to an outer portion of a tube structure, the graphite felt described based on FIGS. 5A and 5B may be used as the cathode current collector.

In the sodium secondary battery according to the exemplary embodiment of the present invention, the current collector including the graphite felt serves to collect or supply charges (electrons) and make an electric connection to the outside of the battery. This electric connection to the outside of the battery may be made through the opposite surface, which is a surface opposing the first surface of the graphite felt (surface in which the opening part of the open pore channel is positioned). In detail, the current collector may include the graphite felt and a metal membrane coming in contact with the opposite surface of the graphite felt, and the electric connection to the outside of the battery may be made by the metal membrane coming in contact with the opposite surface. In this case, the metal membrane coming in contact with the opposite surface may be a metal membrane separately provided for the cathode current collector or a part of the existing component of the battery. In this case, the existing component of the battery may include a metallic battery case, and the case in which the metal membrane is a part of the battery case may include the case in which the opposite surface of the graphite felt is positioned while coming in contact with the battery case.

As described above, the sodium secondary battery according to the exemplary embodiment of the present invention may have a plate type structure or tube type structure depending on a shape of the sodium ion conductive solid electrolyte separating and partitioning the anode space and the cathode space from each other, but the sodium secondary battery may have any structure as long as the structure is generally known in the art.

Figure 7:
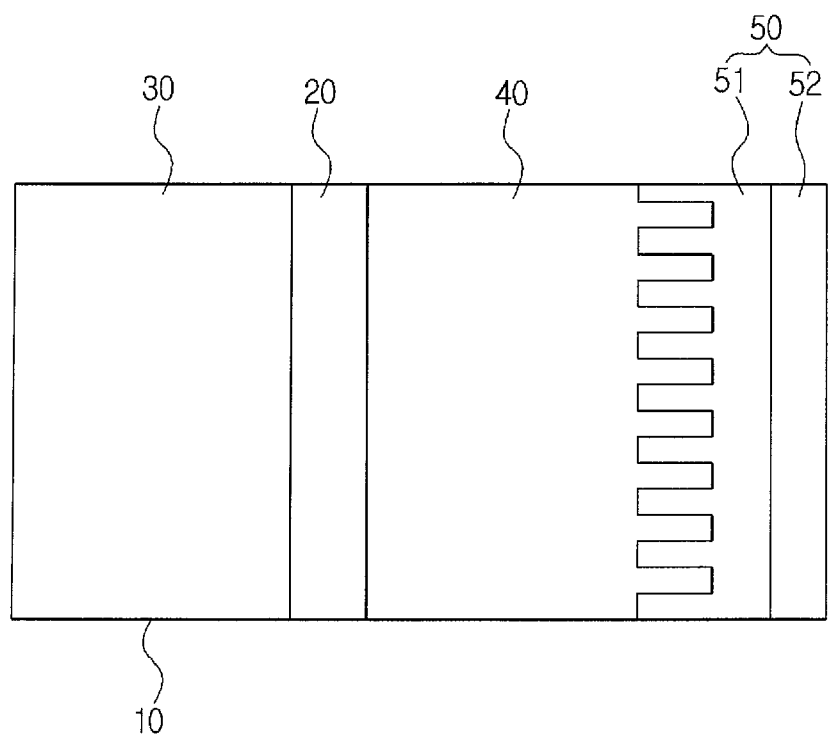
FIG. 7 is a cross-sectional view showing an example of a structure of the sodium secondary battery according to the exemplary embodiment of the present invention.

FIG. 7 is a cross-sectional view showing the case in which the sodium secondary battery according to the exemplary embodiment of the present invention has a plate type structure, based on the case in which an anode active material is molten sodium. As shown in FIG. 7, the sodium secondary battery according to the exemplary embodiment of the present invention may include a battery case 10 separating battery components from the outside, a solid electrolyte 20 partitioning and separating an internal space of the battery case into a cathode space and an anode space, an anode 30 positioned in the anode space and containing sodium, a cathode solution 40 positioned in the cathode space, and a cathode current collector 50 including the above-mentioned graphite felt 51 immersed in the cathode solution. In this case, the first surface, which is the surface of the graphite felt coming in contact with the cathode solution, may be a surface facing the solid electrolyte, and as described above, the open pore channels of which the opening part is positioned in the first surface may be formed in the graphite felt. In addition, the cathode current collector 50 may further include a metal membrane 52, wherein the metal membrane 52 may be positioned while coming in contact with the opposite surface, which is the surface opposing the first surface of the graphite felt 51. In addition, an anode current collector put in molten sodium, which is an anode active material, may be further provided in the anode space for electric connection between the outside of the battery and the anode and a flow of charges (for example, electrons).

Figure 8:
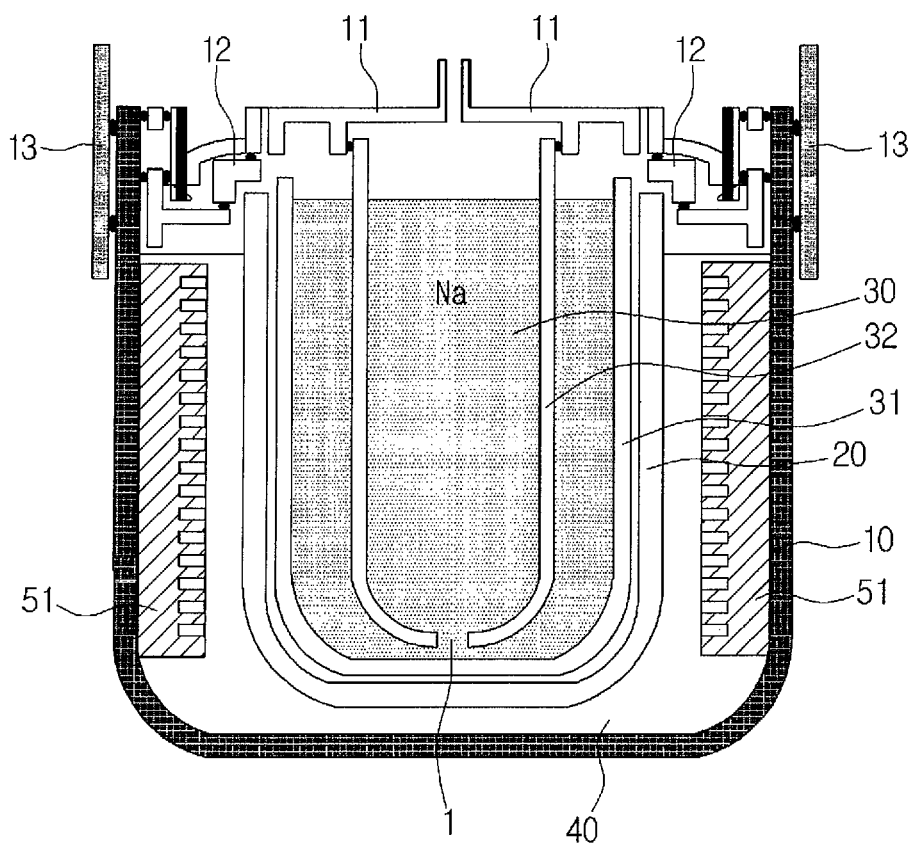
FIG. 8 is a cross-sectional view showing another example of the structure of the sodium secondary battery according to the exemplary embodiment of the present invention.

FIG. 8 is a cross-sectional view showing another example of the structure of the sodium secondary battery according to the exemplary embodiment of the present invention, based on the case in which an anode active material is molten sodium. FIG. 8 shows an example of the tube type sodium secondary battery, but the present invention is not limited to a physical shape of the battery. That is, the sodium secondary battery according to the present invention may have the plate type structure as shown in FIG. 7 or a structure of a general sodium based secondary battery.

As shown in FIG. 8, the sodium secondary battery according to the exemplary embodiment of the present invention may include a cylindrical metal housing (battery case 10) having a closed lower end and an opened upper end, a tube shaped solid electrolyte (hereinafter, a solid electrolyte tube 20) having a closed lower end, a safety tube 31, and a wicking tube 32, which are sequentially positioned in the metal housing 10 from an outer side of the metal housing 10 toward an inner side thereof.

More specifically, the wicking tube 32 positioned at the innermost portion, that is, the center of the metal housing 10, may have a tube shape in which a through-hole 1 is formed at a lower end thereof, and the safety tube 31 may be positioned at an outer side of the wicking tube 32 and have a structure in which the safety tube 31 encloses the wicking tube 32 while being spaced apart from the wicking tube 31 by a predetermined distance.

An anode 30 containing molten sodium is provided in the wicking tube 32 and may have a structure in which it fills an empty space between the wicking tube 32 and the safety tube 31 through the through-hole 1 formed at a lower portion of the wicking tube 32.

A dual structure of the wicking tube 32 and the safety tube 31 is a structure in which a violent reaction between cathode materials and anode materials may be prevented when a tube type solid electrolyte 20 is damaged and a level of the molten sodium may be constantly maintained by capillary force even at the time of discharge.

The tube type solid electrolyte 20 is positioned at an outer side of the safety tube 31 so as to enclose the safety tube 31 and may be a tube shaped solid electrolyte having selective permeability to the sodium ion (Nat).

A cathode solution 40 and graphite felt 51 may be provided in a space between the tube type solid electrolyte 20 enclosing the safety tube 31 and the metal housing 10.

That is, the sodium secondary battery according to the exemplary embodiment of the present invention may have a concentric structure in which the wicking tube 32, the safety tube 31, the tube type solid electrolyte 20, and the metal housing 10 are sequentially disposed from the inner side to the outer side. Here, the anode 30 containing the molten sodium may be loaded in the wicking tube 32, the cathode solution 40 may be provided in the space between the tube type solid electrolyte 20 and the metal housing 10, and the graphite felt 51 may be provided so as to be immersed in the cathode solution 40.

As shown in FIG. 8, based on a charge state, the cathode solution 40 and the graphite felt 51 may be positioned in the cathode space, and based on a discharge state, the cathode solution 40 and the graphite felt 51 on which a metal is electroplated may be positioned in the cathode space.

As shown in FIG. 8, the graphite felt positioned in the cathode space of the metal housing 10 may be positioned so that the opposite surface, which is the surface opposing the first surface of the graphite felt 51, comes in contact with an inner wall of the metal housing 10. In this case, the metal housing 10 may serve as a conductor for electric connection to the outside of the battery at an anode portion in addition to the case and serve to apply external potential to the graphite felt 51.

Although a shape in which the graphite felt fills a predetermined part of the cathode space is shown in FIG. 8, the cathode solution may be impregnated in pores of the graphite felt due to porosity of the graphite felt, such that the first surface of the graphite felt may come in contact with the solid electrolyte. In detail, the graphite felt may have a hollow cylindrical shape, and the solid electrolyte, in detail, the tube type solid electrolyte 20 may be positioned in a hollow part of the graphite felt. The first surface, which is a surface of the graphite felt 51 coming in contact with the cathode surface, may be a surface facing the solid electrolyte. The tube type solid electrolyte 20 positioned in the hollow part of the graphite felt 51 comes in contact with the first surface of the graphite felt 51, such that the graphite felt 51 may fill the entire cathode space. Alternatively, the first surface of the graphite felt 51 and the tube type solid electrolyte 20 are spaced apart from each other by a predetermined distance, such that the graphite felt may fill the part of the cathode space. In this case, a second surface of the graphite felt may come in contact with an inner side surface of the metal housing.

In the case in which the graphite felt has the hollow cylindrical shape, a thickness direction of the graphite felt may correspond to a shortest direction between a side surface of the tube type solid electrolyte 20 adjacent to the cathode and the inner side surface of the metal housing 10.

The sodium secondary battery according to the exemplary embodiment of the present invention may further include a cover 11 positioned on the metal housing 10 to close an inner portion of the metal housing, an insulator 12 having a ring shape and positioned at an upper side of the metal housing 10 to electrically insulate between the metal housing 10 and the tube type solid electrolyte 20, and an electrode terminal 13 positioned at a circumference of an upper end of the metal housing 10. Further, in order to minimize evaporation of liquid-state components, internal pressure of the battery closed by the cover 11 immediately after manufacturing the battery may be 15 psi or more, and the cathode current collector 50, more specifically, the second surface of the graphite felt 51 may be electrically connected to the metal housing 10. Furthermore, although not shown, a general anode current collector may be input through a through-hole of the cover so as to be immersed in the anode active material containing the molten sodium loaded in the wicking tube 32 at a predetermined region.

The sodium secondary battery according to the present invention may include the anode containing sodium, the cathode immersed in the cathode solution and including the above-mentioned graphite felt as the cathode current collector, and the sodium ion conductive solid electrolyte separating the anode and the cathode solution from each other. That is, the sodium secondary battery according to the exemplary embodiment of the present invention includes the sodium ion conductive solid electrolyte separating the anode space and the cathode space from each other, the anode positioned in the anode space and containing sodium, the cathode solution positioned in the cathode space, and the cathode immersed in the cathode solution and including the above-mentioned graphite felt as the current collector.

The sodium secondary battery according to the exemplary embodiment of the present invention may be a battery in which electroplating of the metal is generated at the cathode during a battery charge or discharge process. More specifically, the sodium secondary battery may be a battery in which the electroplating of the metal is generated at the cathode during the battery discharge process. In this case, the electroplated metal may be at least one metal selected from a group consisting of transition metals and Groups 12 to 14 metals.

More specifically, an electrochemical (charge and discharge) reaction of the battery may occur between sodium; at least one metal selected from the transition metals and Groups 12 to 14 metals (hereinafter, referred to as a cathode active metal); and halogen. In addition, the cathode solution may contain a solvent dissolving a sodium halide, a cathode active metal halide, and a halide of at least one metal selected from the group consisting of the alkali metals, the transition metals, and Groups 12 to 14 metals.

That is, the sodium secondary battery according to the exemplary embodiment of the present invention may include the anode containing sodium; the cathode solution containing the solvent dissolving an alkali metal halide and the cathode active metal halide; the cathode including the above-mentioned graphite felt as the cathode current collector and immersed in the cathode solution; and the sodium ion conductive solid electrolyte separating the anode and the cathode solution from each other.

In this case, the alkali metal may include lithium (Li), sodium (Na), and potassium (K), the transition metal may include titanium (Ti), vanadium (V), chromium (Cr), manganese (Mn), iron (Fe), cobalt (Co), nickel (Ni), and copper (Cu), and Groups 12 to 14 metals may include zinc (Zn), aluminum (Al), cadmium (Cd), and tin (Sn).

In the sodium secondary battery according to the exemplary embodiment of the present invention, a charge reaction is carried out according to the following Reaction Formula 1, and a discharge reaction is carried out according to the following Reaction Formula 2, and at the time of charging and discharging the battery, the sodium halide and cathode active metal halide of Reaction Formulas 1 and 2 may be dissolved in the cathode solution to thereby be in a liquid-state.

$$m\text{NaX} + M \rightarrow m\text{Na} + MX_m \quad \text{(Reaction Formula 1)}$$

$$m\text{Na} + MX_m \rightarrow m\text{NaX} + M \quad \text{(Reaction Formula 2)}$$

In Reaction Formulas 1 and 2, M is at least one metal (cathode active metal) selected from the transition metals and Groups 12 to 14 metals, X is a halogen atom, and m is a natural number of 1 to 4. In detail, in Reaction Formulas 1 and 2, m may be a natural number corresponding to a positive valence of the metal M.

More specifically, in the sodium secondary battery according to the exemplary embodiment of the present invention, the cathode may be the above-mentioned graphite felt and the cathode solution itself, based on the charge state of the battery by the charge reaction according to Reaction Formula 1. That is, based on the charge state, the cathode in a solid state may be formed of only the cathode current collector. Based on the discharge state of the battery by the discharge reaction according to Reaction Formula 2, the cathode may be the cathode current collector including the graphite felt on which the cathode active metal is electroplated from the cathode solution, that is, the graphite felt on which the cathode active metal is attached, loaded or impregnated by electroplating the cathode active metal.

In the sodium secondary battery according to the exemplary embodiment of the present invention, as the charge and discharge are repeatedly performed, metal ionization that the cathode active metal electroplated on the graphite felt, which is the current collector (cathode current collector), is converted into cathode active metal, ions to thereby be dissolved in the cathode solution, and reduction that the dissolved cathode active metal ions are electroplated on the graphite felt (cathode current collector) again may be repeatedly performed.

In describing the sodium secondary battery according to the exemplary embodiment of the present invention, for clear understanding, the cathode and the charge and discharge reaction are described based on the reaction products or materials (the sodium halide, the cathode active metal halide, or the like) at the time of the charge and discharge reaction of Reaction Formulas 1 and 2. However, according to the present invention, as all of the reaction products of the sodium halide and the cathode active metal halide except for the electroplated metal exist in a state in which the reaction products are dissolved in the solvent, the sodium halide may be interpreted as the sodium ion and halide ion, and the cathode active metal halide may be interpreted as ions of at least one metal (cathode active metal) selected from the transition metals and Groups 12 to 14 metals and the halide ion.

As described above, as the cathode current collector includes the graphite felt, a significantly wide reaction area may be provided due to a significantly high porosity, and a large amount of the cathode solution may be put in the graphite felt. In addition, as the pore channel having the opening part formed on the surface (the first surface) of the graphite felt adjacent to the solid electrolyte transferring the sodium ion from the anode to the cathode is formed in the graphite felt, a permanent decrease in capacity caused by non-uniform metal electroplating and detachment of the electroplated metal may be prevented by allowing the metal to be electroplated in the graphite felt.

In the sodium secondary battery according to the exemplary embodiment of the present invention, a concentration of the active material containing the cathode active metal halide and/or the sodium halide that are dissolved in the solvent of the cathode solution may be directly related to an amount of the material capable of participating in the electrochemical reaction of the battery and affect energy capacity per unit volume of the battery and conductivity of the ions (including sodium ions) in the cathode solution.

In the sodium secondary battery according to the exemplary embodiment of the present invention, the cathode solution may contain the active material at a concentration of 0.1 to 10M, preferably, 0.5 to 10M, more preferably, 1 to 6M, and most preferably 2 to 5M.

More specifically, in the sodium secondary battery according to the exemplary embodiment of the present invention, the cathode solution may contain the cathode active metal halide at a concentration of 0.1 to 10M, preferably, 0.5 to 10M, more preferably, 1 to 6M, and most preferably 2 to 5M. According to the charge or discharge state of the battery, the cathode active metal may exist in the cathode solution in an ionic state or be electroplated on the cathode current collector, such that an ionic concentration of the cathode active metal in the cathode solution may be changed. Here, the concentration of the cathode active metal halide in the cathode solution as described above may be a concentration based on the charge state.

Based on the charge state, in the case in which the cathode active metal halide has an excessively low concentration of less than 0.1, conductivity of the ions participating in the electrochemical reaction of the battery such as the sodium ion is excessively decreased, such that efficiency of the battery may be decreased, and capacity itself of the battery may be significantly low. Further, in the case in which the concentration of the cathode active metal halide is more than 10M, conductivity of the sodium ion may be decreased by the metal ion having the same charge as that of the sodium ion. However, ionic conductivity in the cathode solution may be adjusted by additionally adding an additive capable of increasing conductivity of the sodium ion while not participating in a net reaction of the battery, such as excess sodium halide to be described below, and the concentration of the cathode active metal halide may be adjusted according to the use of the battery and the design capacity thereof.

In the sodium secondary battery according to the exemplary embodiment of the present invention, the concentration of the sodium halide may also be determined by the concentration of the cathode active metal halide in the cathode solution according to the above-mentioned Reaction Formula 2, but in order to improve conductivity of the sodium ion in the cathode solution, the cathode may further contain a sodium halide together with the cathode active metal halide based on the charge state.

More specifically, according to the exemplary embodiment of the present invention, when the charge and discharge reactions of the battery represented by Reaction Formulas 1 and 2 are performed, in order to improve conductivity of the sodium ion and induce a more rapid charge or discharge reaction in the cathode solution containing the cathode active metal ion having a predetermined concentration, the cathode may contain the sodium ion and the halide ion at amounts larger than those determined by the discharge reaction according to the Reaction Formula 2.

Therefore, the cathode solution may contain the cathode active metal halide and the sodium halide that are dissolved in the solvent. In detail, the cathode solution in the charge state may contain the cathode active metal halide and the sodium halide that are dissolved in the solvent. Therefore, a liquid-state cathode in the charge state may contain the metal ion, the sodium ion, and the halide ion.

In the sodium secondary battery according to the exemplary embodiment of the present invention, the cathode solution in the charge state may further contain 0.1 to 3M of sodium halide based on 1M of the cathode active metal halide. Conductivity of the sodium ion in the cathode solution may be improved through an amount (molar ratio) of the sodium halide based on the cathode active metal halide, and the charge and discharge reactions of Reaction Formulas 1 and 2 may be rapidly and effectively carried out. Further, conductivity of the sodium ion and the reaction rate may be secured even though an operation temperature of the battery is low.

In the sodium secondary battery according to the exemplary embodiment of the present invention, the cathode active metal halide may be a halide defined as the following Chemical Formula 1.

$$MX_m \qquad \text{(Chemical Formula 1)}$$

In Chemical Formula 1, M is at least one selected from nickel (Ni), iron (Fe), copper (Cu), zinc (Zn), cadmium (Cd), titanium (Ti), aluminum (Al), and tin (Sn), X is at least one selected from iodine (I), bromine (Br), chlorine (Cl), and fluorine (F), and m is a natural number of 1 to 4. Here, m may be a natural number corresponding to the valence of the metal.

In the sodium secondary battery according to the exemplary embodiment of the present invention, the alkali metal halide may be a sodium halide, wherein the sodium halide may be a halide defined as the following Chemical Formula 2.

NaX (Chemical Formula 2)

In Chemical Formula 2, X is at least one selected from iodine (I), bromine (Br), chlorine (Cl), and fluorine (F).

More specifically, in the sodium secondary battery according to the exemplary embodiment of the present invention, as the solvent of the cathode, any solvent may be used as long as the solvent may dissolve the sodium halide simultaneously with dissolving the metal halide, but a non-aqueous organic solvent, an ionic liquid, or a mixture thereof may be preferably used in view of improving ionic conductivity of sodium ion, stabilizing charge and discharge cycle characteristics, and improving preservation characteristics capable of preventing self-discharging.

As the non-aqueous organic solvent, at least one selected from alcohol based solvents, polyol based solvents, heterocyclic hydrocarbon based solvents, amide based solvents, ester based solvents, ether based solvents, lactone based solvents, carbonate based solvents, phosphate based solvents, sulfone based solvents, and sulfoxide based solvents may be used, and as the ionic liquid, at least one selected from imidazolium based ionic liquids, piperidinium based ionic liquids, pyridinium based ionic liquids, pyrrolidinium based ionic liquids, ammonium based ionic liquids, phosphonium based ionic liquids, and sulfonium based ionic liquids may be used.

More specifically, in the sodium secondary battery according to the exemplary embodiment of the present invention, as an example of a non-aqueous organic solvent capable of stably maintaining the liquid phase at an operation temperature and pressure of the secondary battery, easily diffusing the sodium ion introduced through the solid electrolyte, not generating undesired side-reactions, having stable solubility for the metal halide and sodium halide, stably performing the charge and discharge cycle for a long period time, and having excellent preservation characteristics, there is at least one selected from a group consisting of 1,2-ethanediol, 1,2-propanediol, 1,3-propanediol, 1,2-butanediol, 1,3-butandiol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, glycerol, ethylene glycol, diethylene glycol, triethylene glycol, tetraethylene glycol, polyethylene glycol, propylene glycol, dipropylene glycol, tripropylene glycol, polypropylene glycol, formamide, N,N-dimethyl formamide, N,N-dimethyl acetamide, N,N-diethyl acetamide, N,N-dimethyl trifluoroacetamide, hexamethylphosphoramide, acetonitrile, propionitrile, butyronitrile, α-terpineol, β-terpineol, dihydro terpineol, N-methyl-2-pyrrolidone (NMP), dimethylsulfoxide, pyrrolidine, pyrroline, pyrrole, 2H-pyrrole, 3H-pyrrole, pyrazolidine, imidazolidine, 2-pyrazoline, 2-imidazoline, 1H-imidazole, triazole, isoxazole, oxazole, thiazole, isothiazole, oxadiazole, oxatriazole, dioxazole, oxazolone, oxathiazole, imidazoline-2-thione, thiadiazole, triazole, piperidine, pyridine, pyridazine, pyrimidine, pyrazine, piperazine, triazine, morpholine, thiomorpholine, indole, isoindole, indazole, benzisoxazole, benzoxazole, benzothiazole, quinoline, isoquinoline, cinnoline, quinazoline, quinoxaline, naphthyridine, phthalazine, benzoxazine, benzoadiazine, pterdine, phenazine, phenothiazine, phenoxazine, and acridine.

An example of the ionic liquid may include one or more solvent selected from a group consisting 1-butyl-3-methylpyridinium bromide, 1-butyl-4-methylpyridinium bromide, 1-butylpyridinium bromide, 1-butyl-2-methylpyridinium bromide, 1-hexylpyridinium bromide, 1-ethylpyridinium bromide, 1-propyl-2-methylpyridinium bromide, 1-propyl-3-methylpyridinium bromide, 1-propyl-4-methylpyridinium bromide, 1-propylpyridinium bromide, 1-ethyl-2-methylpyridinium bromide, 1-ethyl-3-methylpyridinium bromide, 1-ethyl-4-methylpyridinium bromide, 1-ethylpyridinium iodide, 1-butylpyridinium iodide, 1-hexylpyridinium iodide, 1-butyl-2-methylpyridinium iodide, 1-butyl-3-methylpyridinium iodide, 1-butyl-4-methylpyridinium iodide, 1-propylpyridinium iodide, 1-butyl-3-methylpyridinium chloride, 1-butyl-4-methylpyridinium chloride, 1-butylpyridinium chloride, 1-butyl-2-methylpyridinium chloride, 1-hexylpyridinium chloride, 1-butyl-3-methylpyridinium hexafluorophosphate, 1-butyl-4-methylpyridinium hexafluorophosphate, 1-butylpyridinium hexafluorophosphate, 1-ethylpyridinium hexafluorophosphate, 1-hexylpyridinium hexafluorophosphate, 1-butyl-2-methylpyridinium hexafluorophosphate, 1-propylpyridinium hexafluorophosphate, 1-butyl-2-methylpyridinium trifluoromethanesulfonate, 1-butyl-3-methylpyridinium trifluoromethanesulfonate, 1-butyl-4-methylpyridinium trifluoromethanesulfonate, 1-hexylpyridinium trifluoromethanesulfonate, 1-butylpyridinium trifluoromethanesulfonate, 1-ethylpyridinium trifluoromethanesulfonate, 1-propylpyridinium trifluoromethanesulfonate, 1-butyl-3-methylpyridinium hexafluorophosphate, 1-butyl-4-methylpyridinium hexafluorophosphate, 1-butylpyridinium hexafluorophosphate, 1-hexylpyridinium hexafluorophosphate, 1-butyl-2-methylpyridinium hexafluorophosphate, 1-ethylpyridinium hexafluorophosphate, 1-propylpyridinium hexafluorophosphate, 1-ethylpyridinium bis(trifluoromethylsulfonyl)imide, 1-propylpyridinium bis(trifluoromethylsulfonyl)imide, 1-butylpyridinium bis(trifluoromethylsulfonyl)imide, 1-ethyl-3-methylpyridinium bis(trifluoromethylsulfonyl)imide, 3-methyl-1-propylpyridinium bis(trifluoromethylsulfonyl)imide, 1-butyl-3-methylpyridinium bis(trifluoromethylsulfonyl)imide, 1-ethyl-4-methylpyridinium bis(trifluoromethylsulfonyl)imide, 4-methyl-1-propylpyridinium bis(trifluoromethylsulfonyl)imide, 1-butyl-4-methylpyridinium bis(trifluoromethylsulfonyl)imide, 1-butyl-2-methylpyridinium bis(trifluoromethylsulfonyl)imide, 1-ethyl-2-methylpyridinium bis(trifluoromethylsulfonyl)imide, 2-methyl-1-propylpyridinium bis(trifluoromethylsulfonyl), 1-ethyl-3-methylimidazolium methylcarbonate, 1-butyl-3-methylimidazolium methylcarbonate, 1-ethyl-3-methylimidazolium tricyanomethanide, 1-butyl-3-methylimidazolium tricyanomethanide, 1-ethyl-3-methylimidazolium bis(perfluoroethylsulfonyl)imide, 1-butyl-3-methylimidazolium bis(perfluoroethylsulfonyl)imide, 1-ethyl-3-methylimidazolium dibutylphosphate, 1-butyl-3-methylimidazolium dibutylphosphate, 1-ethyl-3-methylimidazolium methyl sulfate, 1,3-dimethylimidazolium methyl sulfate, 1-ethyl-3-methylimidazolium ethyl sulfate, 1,3-diethylimidazolium ethyl sulfate, 1,3-dimethylimidazolium dimethyl phosphate, 1-ethyl-3-methylimidazolium dimethyl phosphate, 1-butyl-3-methylimidazolium dimethyl phosphate, 1-ethyl-3-methylimidazolium diethyl phosphate, 1,3-diethylimidazolium diethyl phosphate, 1-butyl-3-methylimidazolium hydrogen sulfate, 1-ethyl-3-methylimidazolium hydrogen sulfate, 1-butyl-3- methylimidazolium methanesulfonate, 1-ethyl-3-methylimidazolium methanesulfonate, 1-ethyl-3-methylimidazolium tosylate, 1-ethyl-3-methylimidazolium 1,1,2,2-tetrafluoroethanesulfonate, 1-methyl-3-propylimidazolium 1,1,2,2-tetrafluoroethanesulfonate, 1-butyl-3-methylimidazolium 1,1,2,2-tetrafluoroethanesulfonate, 1-benzyl-3-methylimidiazolium 1,1,2,2-tetrafluoroethanesulfonate, 1-butyl-3-ethylimidazolium 1,1,2,2-tetrafluoroethanesulfonate, 1-methylimidazolium 1,1,2,2-tetrafluoroethanesulfonate, 1-ethylimidazolium 1,1,2,2-tetrafluoroethanesulfonate, 1-ethyl-3-methylimidazolium thiocyanate, 1-butyl-3-methylimidazolium thiocyanate, 1-ethyl-3-methylimidazolium dicyanamide, 1-butyl-3-methylimidazolium dicyanamide, 1-allyl-3-methylimidazolium dicyanamide, 1-benzyl-3-methylimidazolium dicyanamide, 1-methyl-3-propylimidazolium iodide, 1=hexyl-3-methylimidazolium iodide, 1-ethyl-3-methylimidazolium iodide, 1,2-dimethyl-3-propylimidazolium iodide, 1-butyl-3-methylimidazolium iodide, 1-dodecyl-3-methylimidazolium iodide, 1-butyl-2,3-dimethylimidazolium iodide, 1-hexyl-2,3-dimethylimidazolium iodide, 1,3-dimethylimidazolium iodide, 1-allyl-3-methylimidazolium iodide, 1-butyl-3-methylimidazolium chloride, 1-allyl-3-methylimidazolium chloride, 1-(2-hydroxyethyl)-3-methylimidazolium chloride, 1,3-didecyl-2-methylimidazolium chloride, 1-hexyl-3-methylimidazolium chloride, 1-butyl-2,3-dimethylimidazolium chloride, 1-decyl-3-methylimidazolium chloride, 1-methyl-3-octylimidazolium chloride, 1-ethyl-3-methylimidazolium chloride, 1-methylimidazolium chloride, 1-hexadecyl-3-methylimidazolium chloride, 1-dodecyl-3-methylimidazolium chloride, 1-benzyl-3-methylimidazolium chloride, 1-methyl-3-tetradecylimidazolium chloride, 1-methyl-3-propylimidazolium chloride, 1-methyl-3-octadecylimidazolium chloride, 1-ethylimidazolium chloride, 1,2-dimethylimidazolium chloride, 1-ethyl-2,3-dimethylimidazolium trifluoromethanesulfonate, 1-ethyl-3-methylimidazolium trifluoromethanesulfonate, 1-butyl-3-methylimidazolium trifluoromethanesulfonate, 1-butyl-2,3-dimethylimidazolium trifluoromethanesulfonate, 1-decyl-3-methylimidazolium trifluoromethanesulfonate, 1-hexyl-3-methylimidazolium trifluoromethanesulfonate, 1-methyl-3-octylimidazolium trifluoromethanesulfonate, 1-dodecyl-3-methylimidazolium trifluoromethanesulfonate, 1-methylimidazolium trifluoromethanesulfonate, 1-ethylimidazolium trifluoromethanesulfonate, 1-methyl-3-propylimidazolium trifluoromethanesulfonate, 1-ethyl-3-methylimidazolium acetate, 1-butyl-3-methylimidazolium acetate, 1-ethyl-3-methylimidazolium trifluoroacetate, 1-butyl-3-methylimidazolium trifluoroacetate, 1-ethyl-3-methylimidazolium nitrate, 1-methylimidazolium nitrate, 1-ethylimidazolium nitrate, 1-butyl-3-methylimidazolium tetrachloroferrate(III), 1-ethyl-3-methylimidazolium bis(trifluoromethylsulfonyl)imide, 1-methyl-3-propylimidazolium bis(trifluoromethylsulfonyl)imide, 1-butyl-3-methylimidazolium bis(trifluoromethylsulfonyl)imide, 1-hexyl-3-methylimidazolium bis(trifluoromethylsulfonyl)imide, 1-methyl-3-octylimidazolium bis(trifluoromethylsulfonyl)imide, 1-decyl-3-methylimidazolium bis(trifluoromethylsulfonyl)imide, 1-dodecyl-3-methylimidazolium bis(trifluoromethylsulfonyl)imide, 1-methyl-3-tetradecylimidazolium bis(trifluoromethylsulfonyl)imide, 1-hexadecyl-3-methylimidazolium bis(trifluoromethylsulfonyl)imide, 1-butyl-2,3-dimethylimidazolium bis(trifluoromethylsulfonyl)imide, 1-ethyl-2,3-dimethylimidazolium bis(trifluoromethylsulfonyl)imide, 1,2-dimethyl-3-propylimidazolium bis(trifluoromethylsulfonyl)imide, 1,3-diethylimidazolium bis(trifluoromethylsulfonyl)imide, 1,3-dimethylimidazolium bis(trifluoromethylsulfonyl)imide, 1-methyl-3-octadecylimidazolium bis(trifluoromethylsulfonyl)imide, 1-allyl-3-methylimidazolium bis(trifluoromethylsulfonyl)imide, 1-benzyl-3-methylimidazolium bis(trifluoromethylsulfonyl)imide, 1-methylimidazolium bis(trifluoromethylsulfonyl)imide, 1-ethylimidazolium bis(trifluoromethylsulfonyl)imide, 1,2-dimethylimidazolium bis(trifluoromethylsulfonyl)imide, 1-ethyl-3-propylimidazolium bis(trifluoromethylsulfonyl)imide, 1-butyl-3-ethylimidazolium bis(trifluoromethylsulfonyl)imide, 1-ethyl-3-vinylimidazolium bis(trifluoromethylsulfonyl)imide, 1-butyl-3-vinylimidazolium bis(trifluoromethylsulfonyl)imide, 1-methyl-3-pentylimidazolium bis(trifluoromethylsulfonyl)imide, 1-heptyl-3-methylimidazolium bis(trifluoromethylsulfonyl)imide, 1-methyl-3-nonylimidazolium bis(trifluoromethylsulfonyl)imide, 1-butyl-3-methylimidazolium hexafluorophosphate, 1-hexyl-3-methylimidazolium hexafluorophosphate, 1-methyl-3-octylimidazolium hexafluorophosphate, 1-butyl-2,3-dimethylimidazolium hexafluorophosphate, 1-decyl-3-methylimidazolium hexafluorophosphate, 1-dodecyl-3-methylimidazolium hexafluorophosphate, 1-ethyl-3-methylimidazolium hexafluorophosphate, 1-ethyl-2,3-dimethylimidazolium hexafluorophosphate, 1-methyl-3-propylimidazolium hexafluorophosphate, 1-methyl-3-tetradecylimidazolium hexafluorophosphate, 1-hexadecyl-3-methylimidazolium hexafluorophosphate, 1-methyl-3-octadecylimidazolium hexafluorophosphate, 1-benzyl-3-methylimidazolium hexafluorophosphate, 1,3-diethylimidazolium hexafluorophosphate, 1-ethyl-3-propylimidazolium hexafluorophosphate, 1-butyl-3-ethylimidazolium hexafluorophosphate, 1-methyl-3-pentylimidazolium hexafluorophosphate, 1-heptyl-3-methylimidazolium hexafluorophosphate, 1-methyl-3-nonylimidazolium hexafluorophosphate, 1-ethyl-2,3-dimethylimidazolium tetrafluoroborate, 1-ethyl-3-methylimidazolium tetrafluoroborate, 1-butyl-3-methylimidazolium tetrafluoroborate, 1-hexyl-3-methylimidazolium tetrafluoroborate, 1-methyl-3-octylimidazolium tetrafluoroborate, 1-(2-hydroxyethyl)-3-methylimidazolium tetrafluoroborate, 1-butyl-2,3-dimethylimidazolium tetrafluoroborate, 1-decyl-3-methylimidazolium tetrafluoroborate, 1-hexadecyl-3-methylimidazolium tetrafluoroborate, 1-dodecyl-3-methylimidazolium tetrafluoroborate, 1-methyl-3-propylimidazolium tetrafluoroborate, 1-benzyl-3-methylimidazolium tetrafluoroborate, 1-methyl-3-octadecylimidazolium tetrafluoroborate, 1-methyl-3-tetradecylimidazolium tetrafluoroborate, 1,3-diethylimidazolium tetrafluoroborate, 1-ethyl-3-propylimidazolium tetrafluoroborate, 1-butyl-3-ethylimidazolium tetrafluoroborate, 1-methyl-3-pentylimidazolium tetrafluoroborate, 1-heptyl-3-methylimidazolium tetrafluoroborate, 1-methyl-3-nonylimidazolium tetrafluoroborate, 1-ethyl-3-methylimidazolium bromide, 1-butyl-3-methylimidazolium bromide, 1-butyl-2,3-dimethylimidazolium bromide, 1-decyl-3-methylimidazolium bromide, 1-hexyl-3-methylimidazolium bromide, 1-methyl-3-octylimidazolium bromide, 1-methyl-3-propylimidazolium bromide, 1-dodecyl-3-methylimidazolium bromide, 1-ethyl-2,3-dimethylimidazolium bromide, 1,2-dimethyl-3-propylimidazolium bromide, 1-methylimidazolium bromide, 1-ethylimidazolium bromide, 1,3-diethylimidazolium bromide, 1-ethyl-3-propylimidazolium bromide, 1-butyl-3-ethylimidazolium bromide, 1-ethyl-3-vinylimidazolium bromide, 1-butyl-3-vinylimidazolium bromide, 1-heptyl-3-methylimidazolium bromide, 1-methyl-3-nonylimidazolium bromide, 1-(2-hydroxy-2-methyl-n-propyl)-3-methylimidazolium methanesulfonate, 1-methyl-1-propylpiperidinium bis(trifluoromethylsulfonyl)imide, 1-butyl-1-methylpiperidinium bis(trifluoromethylsulfonyl)imide, 1-butyl-1-methylpiperidinium trifluoromethanesulfonate, 1-methyl-1- propylpiperidinium trifluoromethanesulfonate, 1-methyl-1-propylpiperidinium hexafluorophosphate, 1-butyl-1-methylpiperidinium hexafluorophosphate, 1-methyl-1-propylpiperidinium tetrafluoroborate, 1-butyl-1-methylpiperidinium tetrafluoroborate, 1-methyl-1-propylpiperidinium bromide, 1-butyl-1-methylpiperidinium bromide, 1-butyl-1-methylpiperidinium iodide, 1-methyl-1-propylpiperidinium iodide, 1-butyl-1-methylpyrrolidinium bis(trifluoromethylsulfonyl)imide, 1-methyl-1-propylpyrrolidinium bis(trifluoromethylsulfonyl)imide, 1-methyl-1-octylpyrrolidinium bis(trifluoromethylsulfonyl)imide, 1-ethyl-1-methylpyrrolidinium bis(trifluoromethylsulfonyl)imide, 1-butyl-1-methylpyrrolidinium trifluoromethanesulfonate, 1-methyl-1-propylpyrrolidinium trifluoromethanesulfonate, 1-ethyl-1-methylpyrrolidinium trifluoromethanesulfonate, 1-butyl-1-methylpyrrolidinium hexafluorophosphate, 1-methyl-1-propylpyrrolidinium hexafluorophosphate, 1-ethyl-1-methylpyrrolidinium hexafluorophosphate, 1-butyl-1-methylpyrrolidinium tetrafluoroborate, 1-methyl-1-propylpyrrolidinium tetrafluoroborate, 1-ethyl-1-methylpyrrolidinium tetrafluoroborate, 1-butyl-1-methylpyrrolidinium bromide, 1-methyl-1-propylpyrrolidinium bromide, 1-ethyl-1-methylpyrrolidinium bromide, 1-butyl-1-methylpyrrolidinium chloride, 1-methyl-1-propylpyrrolidinium chloride, 1-butyl-1-methylpyrrolidinium iodide, 1-methyl-1-propylpyrrolidinium iodide, 1-ethyl-1-methylpyrrolidinium iodide, 1-butyl-1-methylpyrrolidinium dicyanamide, 1-methyl-1-propylpyrrolidinium dicyanamide, 1-butyl-1-methylpyrrolidinium 1,1,2,2-tetrafluoroethanesulfonate, 1-methyl-1-propylpyrrolidinium 1,1,2,2-tetrafluoroethanesulfonate, 1-butyl-1-methylpyrrolidinium methylcarbonate, 1-butyl-1-methylpyrrolidinium tricyanomethanide, methyltrioctylammonium bis(trifluoromethylsulfonyl)imide, butyltrimethylammonium bis(trifluoromethylsulfonyl)imide, choline bis(trifluoromethylsulfonyl)imide, tributylmethylammonium bis(trifluoromethylsulfonyl)imide, ethylammonium nitrate, methylammonium nitrate, propylammonium nitrate, dimethylammonium nitrate, butyltrimethylammonium methylcarbonate, methyltrioctylammonium methylcarbonate, N-ethyl-N-methylmorpholinium methylcarbonate, N,N-diethyl-N-methyl-N-(2-methoxyethyl)ammonium bis(trifluoromethylsulfonyl)-imide, N,N-diethyl-N-methyl-N-(2-methoxyethyl) ammonium tetrafluoroborate, butyltrimethylammonium 1,1,2,2-tetrafluoroethanesulfonate, tetraethylammonium 1,1,2,2-tetrafluoroethanesulfonate, 2-hydroxyethylammonium formate, choline dihydrogen phosphate, methyltrioctylammonium trifluoromethanesulfonate, trihexyltetradecylphosphonium bromide, tetrabutylphosphonium bromide, tetraoctylphosphonium bromide, trihexyltetradecylphosphonium chloride, tributyltetradecylphosphonium chloride, tributylmethylphosphonium methylcarbonate, trioctylmethylphosphonium methylcarbonate, trihexyltetradecylphosphonium decanoate, trihexyltetradecylphosphonium bis(2,4,4-trimethylpentyl)phosphinate, trihexyltetradecylphosphonium dicyanamide, triisobutylmethylphosphonium tosylate, trihexyltetradecylphosphonium hexafluorophosphate, tributylmethylphosphonium methyl sulfate, tetrabutylphosphonium chloride, ethyltributylphosphonium diethyl phosphate, tributyltetradecylphosphonium dodecylbenzenesulfonate, trihexyltetradecylphosphonium bis(trifluoromethylsulfonyl)imide, tributylmethylphosphonium 1,1,2,2-tetrafluoroethanesulfonate, triethylsulfonium bis(trifluoromethylsulfonyl)imide, diethylmethylsulfonium bis(trifluoromethylsulfonyl)imide, triethylsulfonium iodide, and trimethylsulfonium iodide.

In the sodium secondary battery according to the exemplary embodiment of the present invention, the solvent of the cathode solution may further contain a heterogeneous solvent having miscibility with the above-mentioned solvent.

As an example of the heterogeneous solvent, there is at least one solvent selected from a group consisting of ethylene carbonate, propylene carbonate, 1,2-butylene carbonate, 2,3-butylene carbonate, 1,2-pentylene carbonate, 2,3-pentylene carbonate, vinylene carbonate, dimethyl carbonate, diethyl carbonate, di(2,2,2-trifluoroethyl) carbonate, dipropyl carbonate, dibutyl carbonate, ethylmethyl carbonate, 2,2,2-trifluoroethyl methyl carbonate, methylpropyl carbonate, ethylpropyl carbonate, 2,2,2-trifluoroethyl propyl carbonate, methyl formate, ethyl formate, propyl formate, butyl formate, dimethyl ether, diethyl ether, dipropyl ether, methylethyl ether, methylpropyl ether, ethylpropyl ether, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, γ-thiobutyrolactone, γ-ethyl-γ-butyrolactone, β-methyl-γ-butyrolactone, γ-valerolactone, β-valerolactone, γ-caprolactone, ε-caprolactone, σ-propiolactone, tetrahydrofuran, 2-methyl tetrahydrofuran, 3-methyl tetrahydrofuran, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, methyl ethylene phosphate, ethyl ethylene phosphate, dimethyl sulfone, ethyl methyl sulfone, methyl trifluoromethyl sulfone, ethyl trifluoromethyl sulfone, methyl pentafluoroethyl sulfone, ethyl pentafluoroethyl sulfone, di(trifluoromethyl)sulfone, di(pentafluoroethyl) sulfone, trifluoromethyl pentafluoroethyl sulfone, trifluoromethyl nonafluorobutyl sulfone, pentafluoroethyl nonafluorobutyl sulfone, sulfolane, 3-methylsulfolane, 2-methylsulfolane, 3-ethylsulfolane, and 2-ethylsulfolane.

In the sodium secondary battery according to the exemplary embodiment of the present invention, the anode may contain an anode active material containing sodium, wherein the anode active material may contain a sodium metal or a sodium alloy. As a non-restrictive example, the sodium alloy may be an alloy of sodium and cesium, an alloy of sodium and rubidium, or a mixture thereof. The anode active material may be a solid-state material or a liquid-state material including a molten state material at the operation temperature of the battery. Here, in order to allow the battery to have capacity of 50 Wh/kg or more, the anode active material may be molten sodium (Na), and the operation temperature of the battery may be 98 to 200° C., preferably 98 to 150° C., and more preferably 98 to 130° C.

In the sodium secondary battery according to the exemplary embodiment of the present invention, as the sodium ion conductive solid electrolyte provided between the cathode and the anode, any material may be used as long as the material may physically separate the cathode and the anode from each other and have selective conductivity for the sodium ion. Therefore, a solid electrolyte generally used for selective conduction of the sodium ion in a battery field may be used. As a non-restrictive example, the solid electrolyte may be Na super ionic conductor (NASICON), β-alumina, or β"-alumina. As a non-restrictive example, the NASICON may include Na—Zr—Si—O based complex oxide, Na—Zr—Si—P—O based complex oxide, Y-doped Na—Zr—Si—P—O based complex oxide, Fe-doped Na—Zr—Si—P—O based complex oxide, or a mixture thereof. In detail, the NASICON may include $Na_3Zr_2Si_2PO_{12}$, $Na_{1+x}Si_xZr_2P_{3-x}O_{12}$ (x is a real number satisfying the following inequality: $1.6<x<2.4$), Y- or Fe-doped $Na_3Zr_2Si_2PO_{12}$, Y- or Fe-doped $Na_{1+x}Si_xZr_2P_{3-x}O_{12}$ (x is a real number satisfying the following inequality: $1.5<x\leq2.4$), or a mixture thereof.

As the sodium secondary battery according to the present invention includes the graphite felt immersed in the cathode solution and formed with the open pore channels of which the opening part is formed on the surface of the graphite felt facing the solid electrolyte as the current collector, the sodium secondary battery may have chemically excellent stability, the reaction area and the loading amount of the cathode solution may be large, and the decrease in the capacity of the battery caused by non-uniform electroplating and dissolution of the metal may be prevented, such that the sodium secondary battery may have stable charge and discharge cycle characteristics. In addition, the sodium secondary battery according to the present invention is configured to include the anode containing sodium, the solid electrolyte having selective conductivity for the sodium ions, and the cathode solution containing the solvent dissolving the cathode active metal halide, such that the sodium secondary battery may operate at a low temperature in a range from room temperature to 200° C., and the electrochemical reactions of the battery are carried out by the cathode active metal halide and the sodium halide dissolved in the cathode solution, such that capacity of the battery may be significantly increased, and an active region at which the electrochemical reactions are carried out may be increased, thereby making it possible to significantly increase a charge/discharge rate of the battery and prevent internal resistance of the battery from being increased.

Hereinabove, although the present invention is described by specific matters, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described embodiments, and the following claims as well as all modified equally or equivalently to the claims are intended to fall within the scope and spirit of the invention.

What is claimed is:

1. A sodium secondary battery comprising:
   a sodium ion conductive solid electrolyte separating an anode space and a cathode space from each other;
   an anode positioned in the anode space and containing sodium;
   a cathode solution positioned in the cathode space; and
   a cathode immersed in the cathode solution, said cathode comprising a body of porous graphite felt which includes, in addition to pores of the porous graphite felt, open channels having openings formed on a surface of the body of porous graphite felt facing the solid electrolyte.

2. The sodium secondary battery of claim 1, wherein one end of each open channel is positioned in the graphite felt.

3. The sodium secondary battery of claim 1, wherein each open channel penetrates through the graphite felt.

4. The sodium secondary battery of claim 1, wherein each open channel has a tapered shape in which a cross section thereof becomes narrow in a length direction.

5. The sodium secondary battery of claim 1, wherein the open channels are regularly distributed.

6. The sodium secondary battery of claim 1, wherein a density of the open channels corresponding to the number of openings per unit surface area of the graphite felt is $1/cm^2$ to $50/cm^2$.

7. The sodium secondary battery of claim 2, wherein a total area of openings corresponding to a total sum of areas of the openings of the open channels is 20 to 80% based on the entire surface area (100%) of the surface of the graphite felt facing the solid electrolyte.

8. The sodium secondary battery of claim 1, further comprising a cylindrical metal case of which one end is closed and the other end is opened, wherein the cathode space and the anode space are partitioned by a tube type solid electrolyte of which one end inserted into the metal case is closed.

9. The sodium secondary battery of claim 8, wherein the cathode space is a space between the cylindrical metal case and the solid electrolyte, and the graphite felt has a cylindrical shape in which the graphite felt comes in contact with an inner surface of the metal case.

10. The sodium secondary battery of claim 1, wherein the cathode further includes a transition metal attached or loaded in the graphite felt.

11. The sodium secondary battery of claim 1, wherein the cathode solution comprises: a metal halide corresponding to a halide of at least one metal selected from transition metals and Groups 12 to 14 metals; and a solvent dissolving the metal halide.

12. The sodium secondary battery of claim 11, wherein at the time of discharge, metal ions of the metal halide comprising the cathode solution are converted into a metal to thereby be electroplated on the graphite felt, and at the time of charge, the metal electroplated on the graphite felt is converted into the metal ions to thereby be dissolved in the cathode solution.

* * * * *